United States Patent [19]

Lowry et al.

[11] Patent Number: 4,979,704

[45] Date of Patent: Dec. 25, 1990

[54] APPARATUS FOR RETAINING A SUPERCONDUCTING CABLE IN A COIL STACK

[75] Inventors: Jerald F. Lowry, Penn Hills Township, Allegheny County; Jeffrey T. Dederer, Wilkins Township, Allegheny County, both of

[73] Assignee: Westinghouse Electric Corp., Pittsburgh, Pa.

[21] Appl. No.: 299,903

[22] Filed: Jan. 23, 1989

[51] Int. Cl.$^5$ .............................................. F16L 3/22
[52] U.S. Cl. ..................................... 248/68.1; 248/49; 335/216
[58] Field of Search ............... 248/49, 68.1, 65; 335/216, 300; 336/DIG. 1; 174/125.1, 168, 126 S, 128 S

[56] References Cited

U.S. PATENT DOCUMENTS

| | | | |
|---|---|---|---|
| 800,052 | 9/1905 | Ayres | 248/68.1 X |
| 3,917,202 | 11/1975 | Reinwall | 248/68.1 |
| 4,347,998 | 9/1982 | Loree | 248/68.1 |
| 4,391,426 | 7/1983 | Gothberg | 248/49 |
| 4,467,303 | 8/1984 | Laskaris | 174/125.1 X |
| 4,542,871 | 9/1985 | Fortsch | 248/68.1 X |
| 4,549,156 | 10/1985 | Mine | 335/216 |
| 4,568,050 | 2/1986 | Radoy | 248/225.1 |

*Primary Examiner*—J. Franklin Foss
*Attorney, Agent, or Firm*—M. G. Panian

[57] ABSTRACT

An apparatus for holding a superconducting cable comprising a support structure having grooves and a slot that receives the cable. The apparatus is also comprised of at least one cable retaining clip. The clip is fitted into the grooves and held thereby such that the clip retains the cable in the slot and in contact with the support structure. In a preferred embodiment, the clip and the support structure are made out of different materials with the clip made of a material that has a lower coefficient of thermal expansion that the material of which the support structure is made.

7 Claims, 2 Drawing Sheets

APPARATUS FOR RETAINING A SUPERCONDUCTING CABLE IN A COIL STACK

FIELD OF THE INVENTION

The present invention pertains to the retention of superconducting cable in coil structure segments. More specifically, the present invention pertains to a clip that retains the superconducting cable in the coil structure segments.

BACKGROUND OF THE INVENTION

In the design of large superconducting coils, such as the SMES (Superconducting Magnetic Energy Storage) coil, the superconductor must be mechanically supported in a thermally and electrically conducting structure. (The superconducting cable is typically comprised of a number of superconducting strands joined to a high purity aluminum stabilizer.) Protection of the SMES coil in the event of a propagating quench depends upon removal of the helium from the coil in a short period of time, and dissipation of the stored electrical energy as heat in the superconducting cable and its support structure, without excessive temperature rise, which could damage coil components. As the superconducting strands go normal (in the event of a quench), current begins to transfer into the stabilizer and the conductor support structure, and heat is generated proportional to the resistivities of the various conductors and the square of the current. The ability to protect the SMES superconducting cable and coil structure in the event of such a quench thus requires a very low electrical and thermal impedance between the superconducting cable and the supporting structure. Clearly, it is very important in the design of such coils to retain the superconducting cable against the coil structure in such a way as to maintain very good thermal and electrical contact.

Furthermore, while the cable is being wound against the structure, it needs to be retained against the possibility of coming out of its slot during the winding process; this is particularly true in the case of a rippled coil design. Because of the large number of coil structure segments required for a large coil such as SMES (approximately 40,000), one cannot afford to do complex machining operations to prepare each coil structure segment for the required cable retainers. Thus, the retainer and coil structure segment machining must both be kept very simple to reduce total costs.

Many retention schemes have been proposed. Most of the proposed schemes require attachment hardware (screws, pins, tie-wires, etc.). Because of this hardware, most of the proposed retention schemes cannot be easily removed after additional turns are wound on the coil, without some coil disassembly to acquire access to the hardware.

The present invention provides retention of the cable in the coil structure segments which is simple, removable without coil disassembly, and inexpensive. It is easy to install and remove, does not require complex preparation of the coil structure segments, and requires no attachment hardware.

SUMMARY OF THE INVENTION

The present invention pertains to an apparatus for holding a superconducting cable. The apparatus comprises a support structure having a slot that receives the cable. Also the support structure has grooves. The apparatus is also comprised of at least one cable retaining clip. The clip is fitted into the grooves and held thereby such that the clip retains the cable in the slot and in contact with the support structure. In a preferred embodiment, the clip and the support structure are made out of different materials with the clip made of a material that has a lower coefficient of thermal expansion than the material of which the support structure is made.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
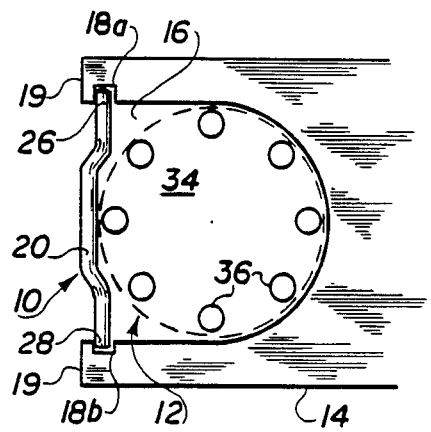
FIG. 1 is a cross-sectional side view of a portion of an apparatus for holding a superconducting cable.

Referring now to the drawings wherein like reference numerals refer to similar or identical parts throughout the several views and more specifically to FIG. 1 thereof there is shown a cross-sectional side view of a portion of an apparatus 10 for holding a superconducting cable 12. The apparatus 10 is comprised of a support structure 14 having a slot 16 that receives the cable 12. The support structure 14 also has grooves 18. Additionally, the apparatus 10 is comprised of at least one cable retaining clip 20. The clip 20 is fitted into the grooves 18 and held thereby such that the clip 20 retains the cable 12 in the slot 16 and in thermal and electrical contact with the support structure 14.

Preferably, the grooves 18 are in communication with the slot 16 and include a first groove 18a and a second groove 18b. The first groove 18a and the second groove 18b are preferably disposed on opposite sides of the slot 16 and in proximity to the exterior surface 19 of the support structure 14. The first groove 18a and the second groove 18b preferably extend essentially the length of the slot 16. The first groove 18a and the second groove 18b can be, for instance, machined into the slot 16, and machined in the same operation in which the slot 16 is machined.

Figure 2:
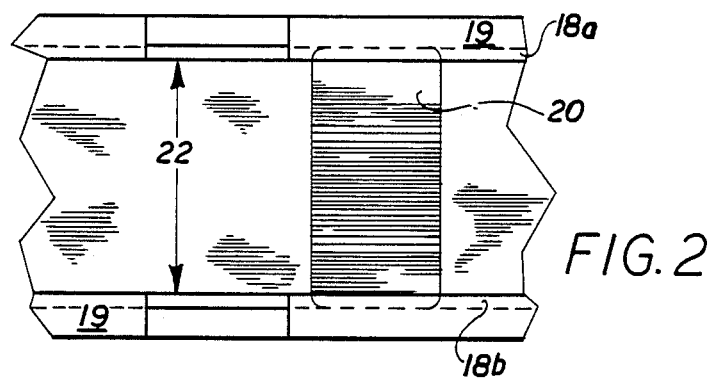
FIG. 2 is a side view of a portion of an apparatus for holding a superconducting cable.
Figure 3:
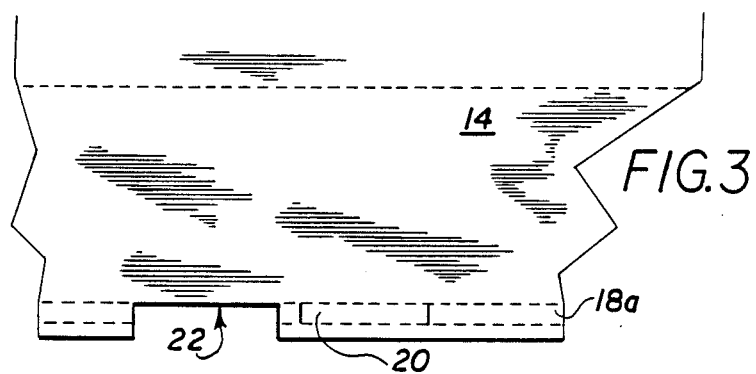
FIG. 3 is an overhead cross-sectional view of a portion of an apparatus for holding a superconducting cable 12.

The support structure 14 preferably includes at least one clip access slot 22 that communicates with the grooves 18 and enables the clip to be inserted therethrough into the grooves as shown in FIGS. 2 and 3. The clip 20 can then be moved along the first and second grooves to a desired position relative to the slot 16 and cable 12. The upper and lower leading and trailing sides of the retaining clip 20 should be chamfered to facilitate insertion and removal. The clip access slot 22 is preferably disposed at a point in the support structure 14 which experiences low bending forces. The clip access slot 22 can be formed, for instance, by machining away the material of the support structure 14 between the exterior surface 19 and the grooves 18. Only one such access slot 22 is required on each apparatus 10, although more may be desirable.

The support structure 14 includes a support structure axis 24 and the slot 16 is preferably positioned about the axis 24 and in communication with the external surface 19 of the support structure 14. Preferably, there are cable retaining clips 20 spaced no closer than 5 to 9 inches apart. Along the slot 16 the clips 20 are fitted into the first groove 18a and second groove 18b. The clip 20 preferably has a length of about 1 diameter of the superconducting cable 12. The clip 20 preferably also has a first end 26 and a second end 28 with the first end 26 and the second end 28 disposed in the first groove 18a and the second groove 18b, respectively. The clip 20 preferably has a cross-sectional shape corresponding to the exterior shape of the cable 12. The clip 20 and the support structure 14 are preferably made out of different materials with the clip made of a material that has a lower coefficient of thermal expansion than the material of which the support structure 14 is made. Preferably, the clip 20 is made out of non-magnetic stainless steel or epoxy glass composite laminate and the support structure 14 is made out of aluminum.

Besides having the support structure 14 and the clip 20 being made out of materials that have different coefficients of thermal expansion to cause the clip 20 to remain in place (for instance, as the apparatus 10 is cooled to a temperature at which the cable achieves superconductivity, the aluminum support structure 14 contracts to a greater extent than the retaining clip 20 and locks in the clip 20 by differential thermal contraction) alternately, or additionally, the first groove 18a and the second groove 18b can be peened or otherwise slightly distorted after the clip 20 is inserted, on either side of the clip 20, to prevent the clip 20 from moving. Or, after the clip 20 is inserted into the grooves 18, the grooves 18 can be blocked near the regress slot 22, for example, with small spreaders (not shown) which can be locked into the first groove 18a and second groove 18b near the access slot 22 to deny further access thereto. The retaining clips 20 can also be fitted with leaf springs or linear wave springs (not shown) to apply sufficient force to the grooves 18 to prevent movement. Additionally, the grooves 18 can be tapered in depth and the retaining clips 20 wedged into the tapered region. This would necessitate machining one set of grooves and access slots at each retaining clip 20 location along the slot 16.

If the latter technique is used to retain the clips 20, each clip 20 then has its own set of first grooves 18a and second grooves 18b. Each first groove 18a and each second groove 18b are disposed on opposite sides of the slot 16. Each first groove 18a and each second groove 18b has a clip access slot 16 that communicates therewith and enables the corresponding clip 20 to be inserted therethrough into the first groove 18a and second groove 18b.

Figure 4:
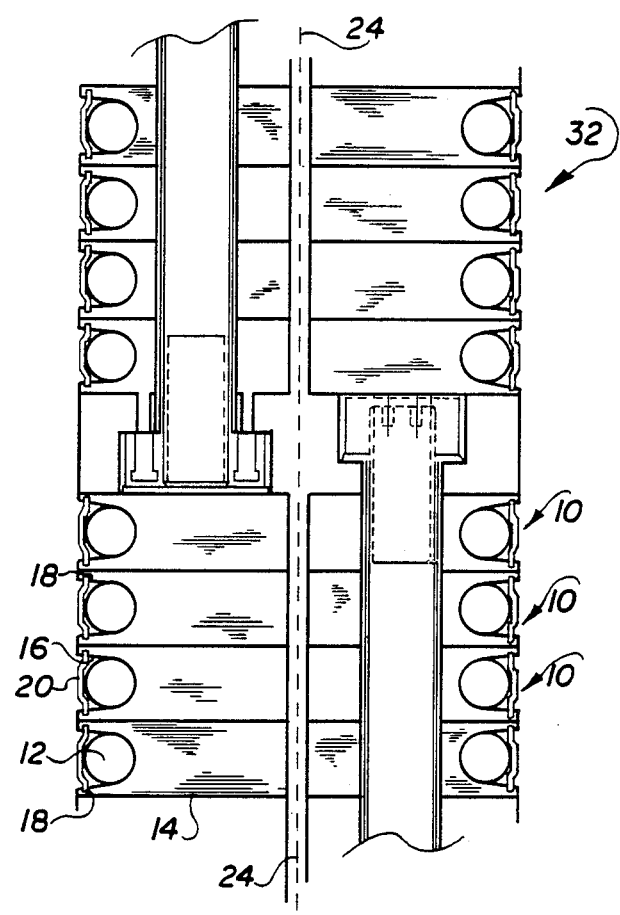
FIG. 4 is a cross-sectional elevation view of an apparatus for holding a superconducting cable.

The apparatus 10 is preferably a support structure segment. When a plurality of support structure segments are stacked on top of each other, they form a coil stack 32 as shown in FIG. 4.

In the operation of the preferred embodiment, the individual support structure segments are stacked one on top of the other along their axis 24 to form a coil stack 32. The superconducting cable 12, which is comprised of an aluminum stabilizer 34 and superconducting strands of NbTi in a Cu matrix, is wound into the coil stack 32 through the slots 16 in each support structure segment. As the cable 12 is wound through the slots 16 of the support structure segment, clips 20 are inserted through corresponding clip access slots 22 into the first groove 18a and second groove 18b and moved therealong until respective clip 20 is positioned over the coil 12 at a desired location in the support structure segment. The clip 20 is positioned over the superconducting cable 12 such that the cable 12 is in contact with the support structure 14. When liquid helium is introduced into and around the coil stack 32, the temperature of the coil stack 32 and the superconducting cable 12 drops to a point where the cable strands 36 become superconducting. As the temperature of the coil stack 32 drops, the aluminum of the support structure 14 contracts around each stainless steel or dielectric retaining clip 20 thus locking it into place in the first groove 18a and second groove 18b. Electricity that is desired to be stored in the coil stack 32 is then provided to the superconducting cable turns which essentially have no resistivity. In the event of a localized quench resulting in a small portion of the cable 12 losing its superconductivity, electrical current flow therein passes into the high purity aluminum stabilizer 34 which has a lower resistivity at that moment. Heat generated in the stabilizer 34 by the passage of said current is conducted into the support structure 14 because the clip 20 causes the cable 12 to contact the support structure 14. When the portion of the superconducting cable 12 that has been locally quenched recovers to the superconducting state, electrical current can once again continue to flow unimpeded in the superconducting strands 36. In the event of a large scale quench resulting in a large portion of the cable 12 losing its superconductivity, electrical current flow therein passes into the high purity aluminum stabilizer 34 which has a lower resistivity at that moment. In such a large scale quench a substantial amount of heat is thus generated in the stabilizer, thereby causing some of the current flow and much of the heat flow to pass into the support structure 14 because the clip 20 causes the cable 12 to contact the support structure, thereby preventing thermal damage to the superconducting cable 12 and support structure 14. In addition, the clips 20, each having a length approximately one diameter of the cable 12 and being placed no closer than every 5 to 9 inches along the slot 16 essentially allow liquid helium to flow into the slot 16 and bathe the superconducting cable 12 to maintain the superconducting cable 12 at a temperature that maintains its superconductivity.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for holding a superconducting cable comprising:

a support structure having a slot that receives the cable, said support structure having grooves disposed in proximity to the exterior surface of the support structure and in communication with the slot;

wherein said grooves include a first groove and a second groove corresponding to each clip, each first groove and second groove disposed on opposite sides of the slot, each first groove and second groove having a clip access slot that communicates therewith and which enables the corresponding clip to be inserted therethrough into the first and second grooves, the clip access slot being disposed at a point in the support structure which experiences low bending forces;

at least one cable retaining clip, said clip fitted into the grooves and held thereby, the clip having a length of about 1 diameter of the coil;

a support structure axis, wherein the slot is positioned about the axis and in communication with the external surface of the support structure and wherein there are clips spaced at least five-nine inches apart along the slot which are fitted into the grooves; and wherein the clip and the support structure are made out of different materials with the clip made of a material that has a lower coefficient of thermal expansion than the material of which the support structure is made, such that the clip retains the cable in the slot and in electrical and thermal contact with the support structure.

2. An apparatus as described in claim 1 wherein the clip is made out of non-magnetic stainless steel or epoxy glass composite laminate, and the support structure is made out of aluminum.

3. An apparatus as described in claim 1 wherein said grooves extend essentially the length of the slot.

4. An apparatus as described in claim 3 wherein the clip has a first end and a second end with the first end and the second end disposed in the first groove and second groove respectively, and the clip has a cross-sectional shape corresponding to the exterior shape of the cable.

5. An apparatus as described in claim 1 wherein the clip has a first end and a second end with the first end and the second end disposed in the first groove and second groove respectively, and the clip has a cross-sectional shape corresponding to the exterior shape of the cable.

6. Apparatus for holding a superconducting cable, the apparatus comprising:

a support structure having a slot that receives the cable, said support structure having first and second grooves disposed on opposite sides of the slot and in communication therewith;

a plurality of cable retaining clips, the support structure having at least one clip access slot that communicates with said first and second grooves and enables said clips to be inserted therethrough into said first and second grooves and held thereby; and wherein the clip is made out of non-magnetic stainless steel or epoxy glass composite laminate, and the support structure is made out of aluminum, such that said clips retain the cable in the slot and in electrical and thermal contact with the support structure.

7. Apparatus for holding a superconducting cable, the apparatus comprising:

a support structure having a slot that receives the cable, said support structure having first and second grooves disposed on opposite sides of the slot and extending substantially along the length thereof, said grooves being in communication with the slot; and a plurality of cable retaining clips, the support structure having at least one clip access slot that communicates with said first and second grooves and enables said clips to be inserted therethrough into said first and second grooves and held thereby, such that said clips retain the cable in the slot and in electrical and thermal contact with the support structure.

* * * * *